United States Patent [19]

Shedigian

[11] Patent Number: 4,538,206
[45] Date of Patent: Aug. 27, 1985

[54] DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 615,562

[22] Filed: May 31, 1984

[51] Int. Cl.³ .............................................. H01G 4/22
[52] U.S. Cl. ............................. 361/315; 174/17 LF; 174/23 C; 174/25 C; 252/578; 252/579; 361/327
[58] Field of Search ............... 252/578, 579; 361/315, 361/327; 174/17 LF, 23 C, 25 C

[56] References Cited

U.S. PATENT DOCUMENTS

| | | | |
|---|---|---|---|
| 3,424,957 | 1/1969 | Katchman | 361/318 |
| 3,588,644 | 6/1971 | Nash et al. | 252/579 |
| 3,925,221 | 12/1975 | Eustance | 252/579 |
| 4,420,791 | 12/1983 | Shedigian | 252/579 |

FOREIGN PATENT DOCUMENTS

| | | | |
|---|---|---|---|
| 2452213 | 5/1975 | Fed. Rep. of Germany . | |
| 2233684 | 1/1975 | France . | |
| 52-65900 | 5/1977 | Japan | 252/579 |

Primary Examiner—Paul Lieberman
Assistant Examiner—Robert A. Wax
Attorney, Agent, or Firm—Robert F. Meyer

[57] ABSTRACT

Capacitance loss is reduced in metallized film capacitors by using a cycloaliphatic epoxide as a dielectric impregnant.

3 Claims, 3 Drawing Figures

DIELECTRIC FLUID FOR A CAPACITOR

BACKGROUND OF THE INVENTION

The present invention generally relates to dielectric fluids used in metallized polypropylene film AC capacitors.

The failures of metallized polymeric film capacitors in AC applications is due primarily to partial discharges or corona and excessive clearing. To eliminate corona the dielectric fluid should possess excellent gas absorptivity, produce low swellability when in contact with polypropylene film, possess oxygen in order to prevent carbonization during clearing, and should not penetrate the capacitor roll. These favorable properties were found in cycloaliphatic epoxies as impregnant for metallized polypropylene film capacitors.

SUMMARY OF THE INVENTION

Accordingly, the present invention provides a dielectric fluid for polypropylene film capacitors comprising a cycloaliphatic epoxide.

BRIEF DESCRIPTION OF THE DRAWINGS

The present invention is illustratively described in respect to the appended drawings in which.

DETAILED DESCRIPTION OF THE DRAWINGS

Figure 1:
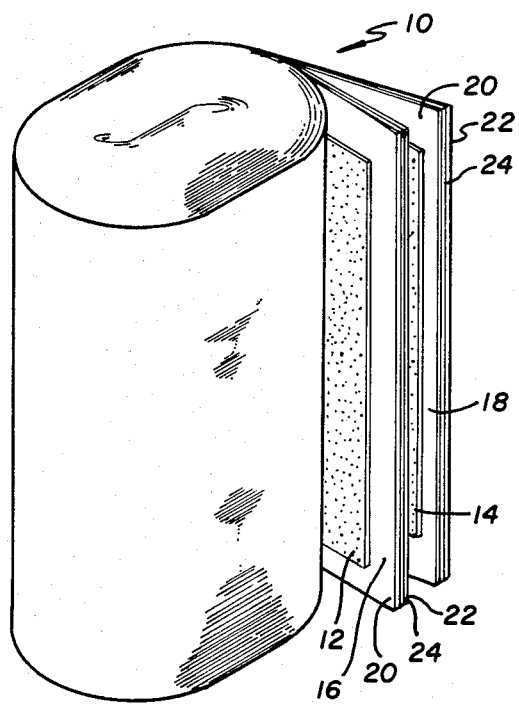
FIG. 1 is a perspective view of the electrode-dielectric body of a convolutely wound capacitor constructed according to an embodiment of the present invention.

FIG. 1 shows the convolutely wound electrodes of a high voltage dielectric capacitor constructed according to one embodiment of the present invention. The capacitor body 10 includes a pair of electrodes 12 and 14 which are separated by a pair of dielectric separators 16 and 18. The electrodes 12 and 14 may be made of any suitable electrically conductive metal such as aluminum. The dielectric means, or separators 16 and 18, used in high voltage capacitors and for the present invention each includes a pair of sheets of polypropylene film 20 and 22 which are separated by a sheet of paper 24.

Figure 2:
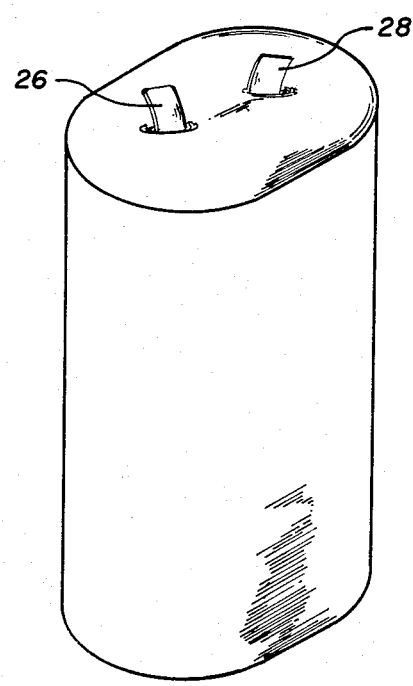
FIG. 2 is a perspective view of the embodiment of FIG. 1 wherein the coil are completely wound and electrical leads are attached to the electrodes.

FIG. 2 shows the electrode body 10 of FIG. 1 with the electrodes completely wound and with a pair of electrical leads 26 and 28, each of which is connected to a separate electrode such as 12 and 14, respectively. The leads 26 and 28 may be made of any suitable material such as solder coated copper.

Figure 3:
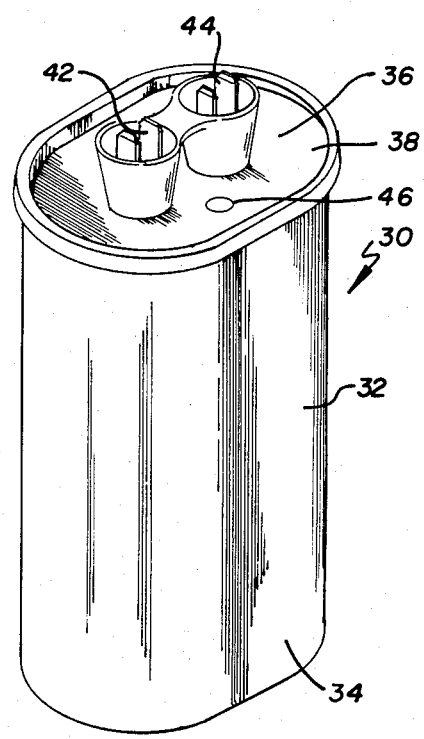
FIG. 3 is a perspective view of the embodiments of FIGS. 1 and 2 after being packaged in a suitable capacitor casing.

FIG. 3 shows a completed capacitor 30 having a housing or can 32 enclosing the electrode body 10. The housing 32 has a closed end 34 and an open end 36 through which the capacitor body 10 is inserted during manufacturing. A cover 38 encloses the end 36 and includes a pair of electrical terminals 42 and 44 which are connected to the leads 26 and 28, respectively, from the electrodes 12 and 14. Any suitable material may be used for the housing 32 and cover 36, such as aluminum, with proper precautions being taken to prevent shorting of either the electrodes 12, 24, leads 26, 28 or terminals 42, 44 thereto.

In the manufacturing of the capacitor 10, electrodes 12 and 14, with electrical leads 26 and 28, are first assembled with the dielectric means or separators 16 and 18 in a stacked fashion. The stack is then rolled to form the capacitor body shown in FIG. 2, and the body is inserted into a housing 34. At this point, the electrical leads 26 and 28 are connected to terminals 42 and 44 on the cover 38. The cover 38 is then attached to the housing 32 and sealed by any suitable means such as welding. The cover 38 also includes an opening or hole 46 to allow the ingress and egress of gasses and liquids. The housing 34 is then placed in a vacuum oven and heat dried for an extended period of time which in most cases would probably be a minimum of at least eight hours. This is needed to drive contaminants such as water from the capacitor body. At this point in the manufacturing process, a dielectric fluid is added under vacuum.

The dielectric fluid which serves as the impregnant and which concerns the present invention is a cycloaliphatic epoxide. A preferred epoxide is that of 3,4-epoxycyclohexylmethyl-3,4- epoxycyclohexane carboxylate which is marketed as Epoxide ERL 4221 by Union Carbide Corporation. Other epoxides which would be used as impregnants (all marketed by Union Carbide) are ERL 4234, (3,4-epoxycyclohexyl-5,5-spiro-3,4-epoxy) cyclohexane-meta-dioxane; ERL4299-bis-(3,4-epoxycyclohexyl) adipate; ERL4205-bis-(2,3-epoxycyclopentyl)ether; ERL4289--3,4-epoxy-6-methylcyclohexylmethyl adipate or their mixtures in any proportions.

A minor amount of butylated hydroxytoluene is added as an antioxidant.

The dielectric fluid is refined to remove water and ionic impurities by passing it through a chromatographic column using aluminum oxide or Fuller's earth or layers of both and placed in a vacuum over for drying. The refined fluid is then introduced into the capacitor shown in FIG. 3 under heat and pressure by submerging the capacitor in the fluid in an evacuated oven. Repetitive pressurizations of the oven to atmospheric pressure and reestablishment of the vacuum can be used to force the dielectric fluid into the capacitor body and its plastic dielectric film. The hole 46 is then typically sealed with solder to complete the manufacturing process.

Table I below clearly shows the improvement in capacitance loss for the impregnant of the present invention. % Capacitance Loss in Metallized Polypropylene Film Capacitors 440 VAC/15μF (10 microns) on Life Test 550 VAC and 80° C., 2000 Hours./

TABLE I

% Capacitance Loss in Metallized Polypropylene Film Capacitors 440 VAC/15μF (10 microns) on Life Test 550 VAC and 80° C., 2000 Hours.

| Fluid | Chemical Name | % Capacitance Loss |
|---|---|---|
| DOP | Dioctyl Phthalate | 5.8 |
| DINP | Diisononyl Phthalate | 4.7 |
| DB Castor Oil | Triglyceride of Fatty Acids | 3.8 |
| Amorphous PP | Non-Crystalline Polypropylene | 8.2 |
| PPG | Polypropylene Glycol | 6.9 (1500 Hrs) |
| Soybean Oil | Glycerides of Fatty Acids | 5.4 |
| Epoxide | 3,4-Epoxycyclohexylmethyl | 1.1 |

TABLE I-continued

% Capacitance Loss in Metallized Polypropylene Film Capacitors 440 VAC/15μF (10 microns) on Life Test 550 VAC and 80° C., 2000 Hours.

| Fluid | Chemical Name | % Capacitance Loss |
|---|---|---|
| ERL4221 | 3,4-Epoxycyclohexane carboxylate | |

What is claimed is:

1. In a metallized polypropylene film capacitor, a dielectric fluid consisting of a cycloaliphatic epoxide.

2. The dielectric fluid of claim 1, wherein said cycloaliphatic epoxide is taken from the class consisting essentially of 3,4-epoxycyclohexylmethyl-3,4-epoxycyclohexane carboxylate; (3,4-epoxycyclohexyl-5,5-spiro-3,4-epoxy) cyclohexane-meta-dioxane; bis-(3,4-epoxycyclohexyl) adipate, bis-(2,3-epoxycyclopentyl) ether; and 3,4-epoxy-6-methylcyclohexylmethyl adipate or mixtures thereof.

3. The dielectric fluid of claim 3, wherein said cycloaliphatic epoxide is 3,4-epoxycyclohexylmethyl-3,4-epoxycyclohexane carboxylate.

* * * * *